US012042075B2

(12) United States Patent
Watterson

(10) Patent No.: US 12,042,075 B2
(45) Date of Patent: Jul. 23, 2024

(54) MASSAGING PILLOW ASSEMBLY

(71) Applicant: William H. Watterson, Nashville, TN (US)

(72) Inventor: William H. Watterson, Nashville, TN (US)

( * ) Notice: Subject to any disclaimer, the term of this patent is extended or adjusted under 35 U.S.C. 154(b) by 217 days.

(21) Appl. No.: 17/243,001

(22) Filed: Apr. 28, 2021

(65) Prior Publication Data

US 2022/0346576 A1 Nov. 3, 2022

(51) Int. Cl.
*A47G 9/10* (2006.01)
*A61H 23/02* (2006.01)

(52) U.S. Cl.
CPC ........... *A47G 9/1045* (2013.01); *A61H 23/02* (2013.01); *A47G 2200/205* (2013.01)

(58) Field of Classification Search
CPC ...... A47G 9/10–109; A47G 2009/1018; A47G 2200/20–205; A61H 23/00–06; A61H 2023/002–045; A61H 2201/0134–0138
USPC .............................................. 601/46; D6/595
See application file for complete search history.

(56) References Cited

U.S. PATENT DOCUMENTS 5,199,678 A * 4/1993 Luebke .................... A47C 7/62 248/205.2
5,381,922 A * 1/1995 Gladman .................. A45F 5/02 D6/567
5,989,286 A 11/1999 Owens
6,065,656 A * 5/2000 Elshof .................... B60N 3/103 220/629
6,647,572 B2 11/2003 Lee
8,327,476 B1 * 12/2012 Paratore ................. A47G 9/062 5/656
8,584,284 B2 11/2013 Matthews
10,201,240 B1 * 2/2019 Arrighi ................ A47G 9/1054
2004/0155047 A1 8/2004 DeBartolo
2007/0271703 A1 * 11/2007 Matthews Brown .. A47D 13/08 5/636
2008/0047986 A1 * 2/2008 Will .......................... A45F 5/02 224/148.3
2010/0108703 A1 * 5/2010 French ................... B65D 25/22 220/737
2011/0088168 A1 * 4/2011 Haynesworth ........... A47G 9/10 5/652
2013/0119716 A1 5/2013 Stronconio
2016/0338516 A1 * 11/2016 Kuznicki, Jr. ............ F16B 1/00
2018/0147963 A1 * 5/2018 Kim-Perek .......... B60N 2/2881
2019/0223602 A1 * 7/2019 Radke .................... B60N 2/891
2019/0231100 A1 * 8/2019 Pietracatella .......... A47C 7/383
2020/0405999 A1 * 12/2020 Goodstadt ............ A47C 31/005
(Continued)

*Primary Examiner* — Kendra D Carter
*Assistant Examiner* — Paige Kathleen Bugg

(57) ABSTRACT

A massaging pillow assembly includes a pillow that has a plurality of pouches each extending into an interior of the pillow to be accessed by a user. A vibration unit is insertable into a respective one of the pouches such that the vibration unit is in mechanical communication with the pillow. The vibration unit generates a vibration when the vibration unit is turned on thereby communicating the vibration into the pillow to soothe the user with the vibration. A pair of pads is each of the pads is coupled to the pillow. Each of the pads is comprised of a friction producing material to inhibit the pillow from sliding. A pair of cup holders is each removably attachable to the pillow to hold a beverage container.

4 Claims, 4 Drawing Sheets

(56) References Cited

U.S. PATENT DOCUMENTS

2021/0169735 A1* 6/2021 Northen ................. A61H 1/005
2021/0186238 A1* 6/2021 Kilo ..................... A47G 9/1045

* cited by examiner

MASSAGING PILLOW ASSEMBLY

(A) TITLE OF THE INVENTION

MASSAGING PILLOW ASSEMBLY

(B) CROSS-REFERENCE TO RELATED APPLICATIONS

Not Applicable

(C) STATEMENT REGARDING FEDERALLY SPONSORED RESEARCH OR DEVELOPMENT

Not Applicable

(D) THE NAMES OF THE PARTIES TO A JOINT RESEARCH AGREEMENT

Not Applicable

(E) INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

(F) STATEMENT REGARDING PRIOR DISCLOSURES BY THE INVENTOR OR JOINT INVENTOR

Not Applicable

(G) BACKGROUND OF THE INVENTION

(1) Field of the Invention.

The disclosure relates to pillow devices and more particularly pertains to a new pillow device for massaging a user with a pillow. The device includes a pillow with a plurality of pouches and a vibration unit that is insertable into one of the pouches. Additionally, a pair of cup holders is provided and each of the cup holders is removably attachable to the pillow for holding beverage containers.

(2) Description of Related Art including information disclosed under 37 CFR 1.97 and 1.98.

The prior art relates to pillow devices including a pillow that has therapeutic thermal properties. Additionally, the prior art discloses a pillow that can be opened to reveal cup holders that are integrated within the pillow. The prior art discloses a cushion that has a vibration unit integrated therein for therapeutic massage. The prior art also discloses a pillow that has a cup holder integrated therein for holding a beverage container.

(H) BRIEF SUMMARY OF THE INVENTION

An embodiment of the disclosure meets the needs presented above by generally comprising a pillow that has a plurality of pouches each extending into an interior of the pillow to be accessed by a user. A vibration unit is insertable into a respective one of the pouches such that the vibration unit is in mechanical communication with the pillow. The vibration unit generates a vibration when the vibration unit is turned on thereby communicating the vibration into the pillow to soothe the user with the vibration. A pair of pads is each of the pads is coupled to the pillow. Each of the pads is comprised of a friction producing material to inhibit the pillow from sliding. A pair of cup holders is each removably attachable to the pillow to hold a beverage container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(I) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(J) DETAILED DESCRIPTION OF THE INVENTION

Figure 1:
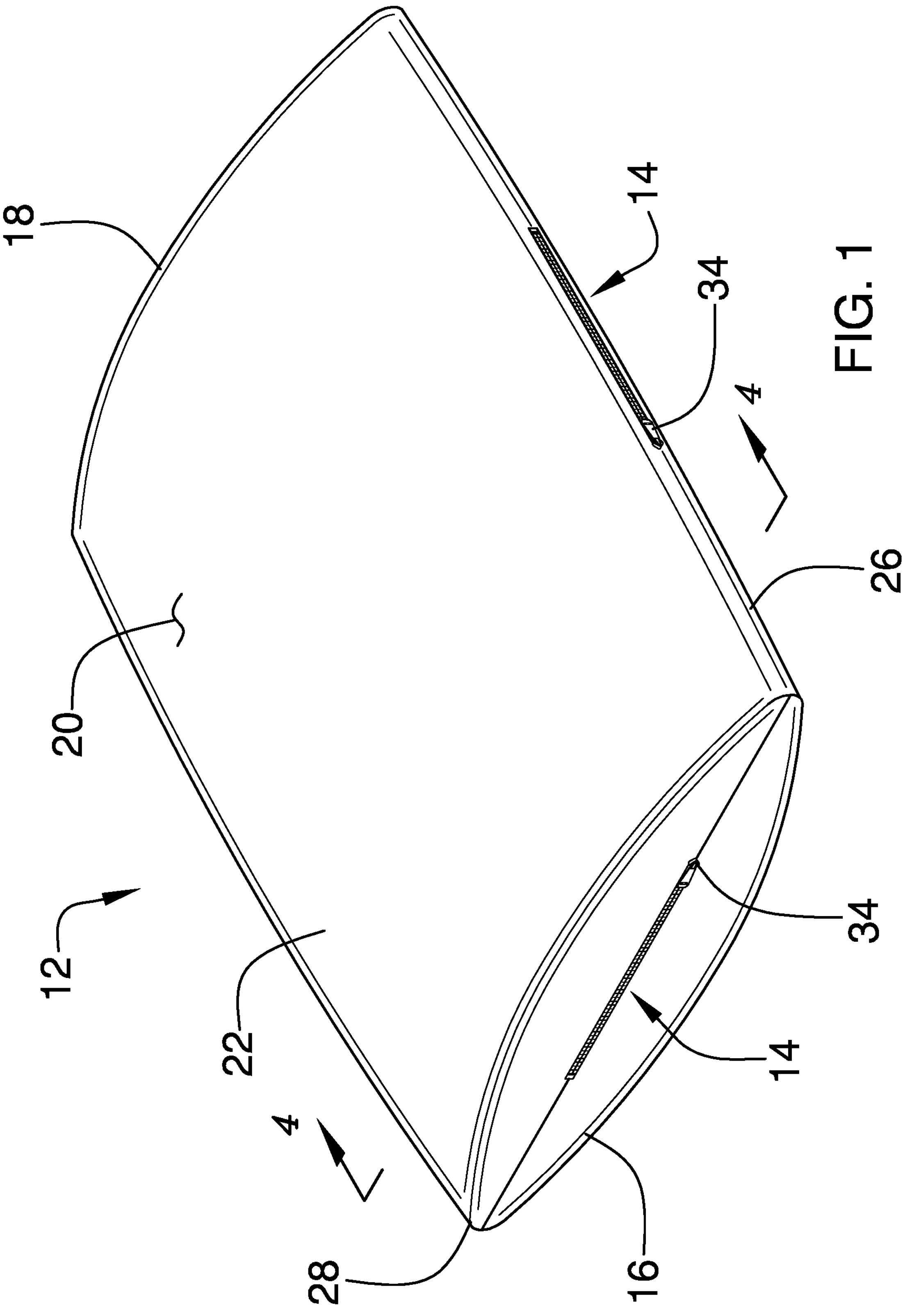
FIG. 1 is a top perspective view of a massaging pillow assembly according to an embodiment of the disclosure.
Figure 2:
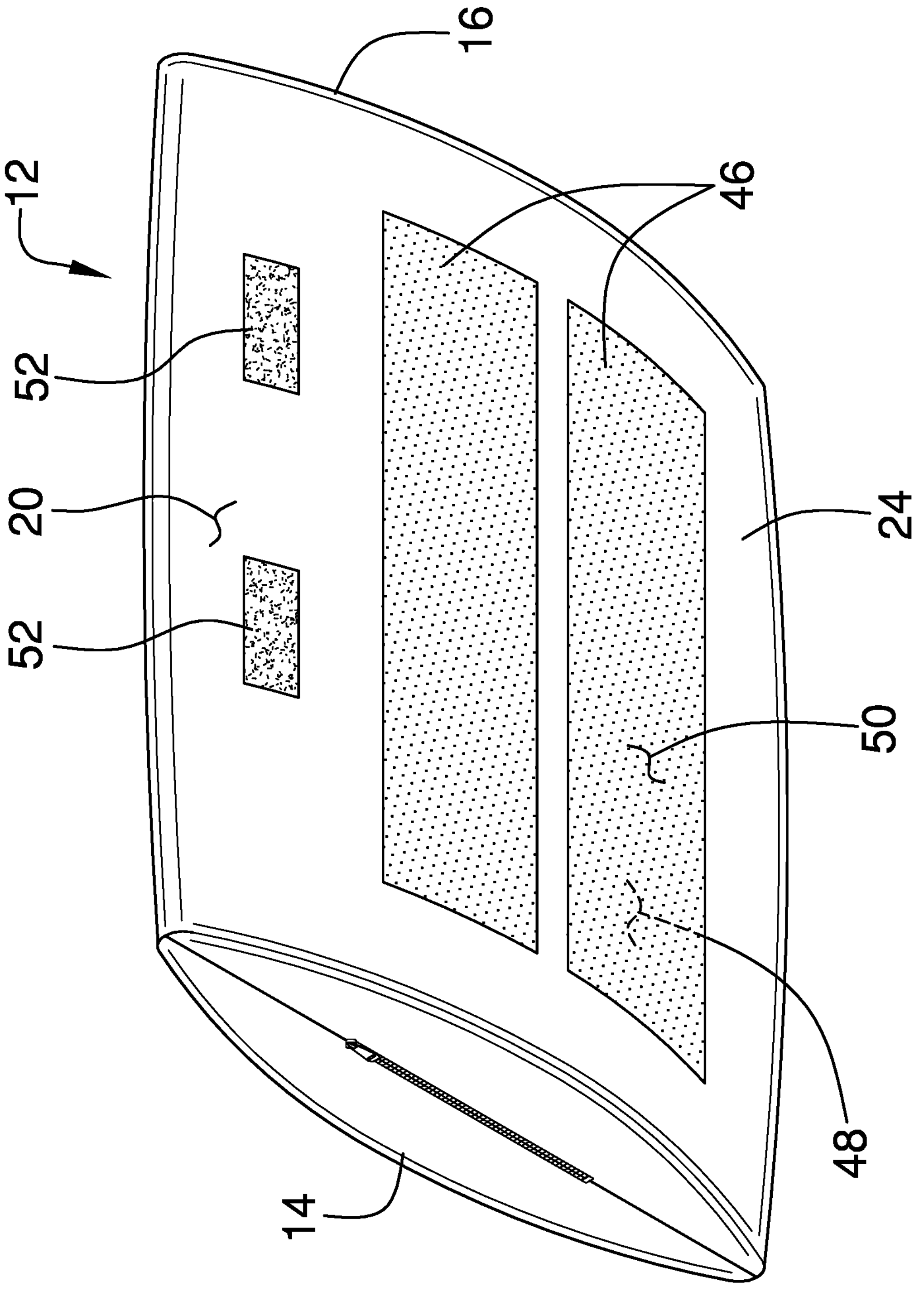
FIG. 2 is a bottom perspective view of an embodiment of the disclosure.
Figure 3:
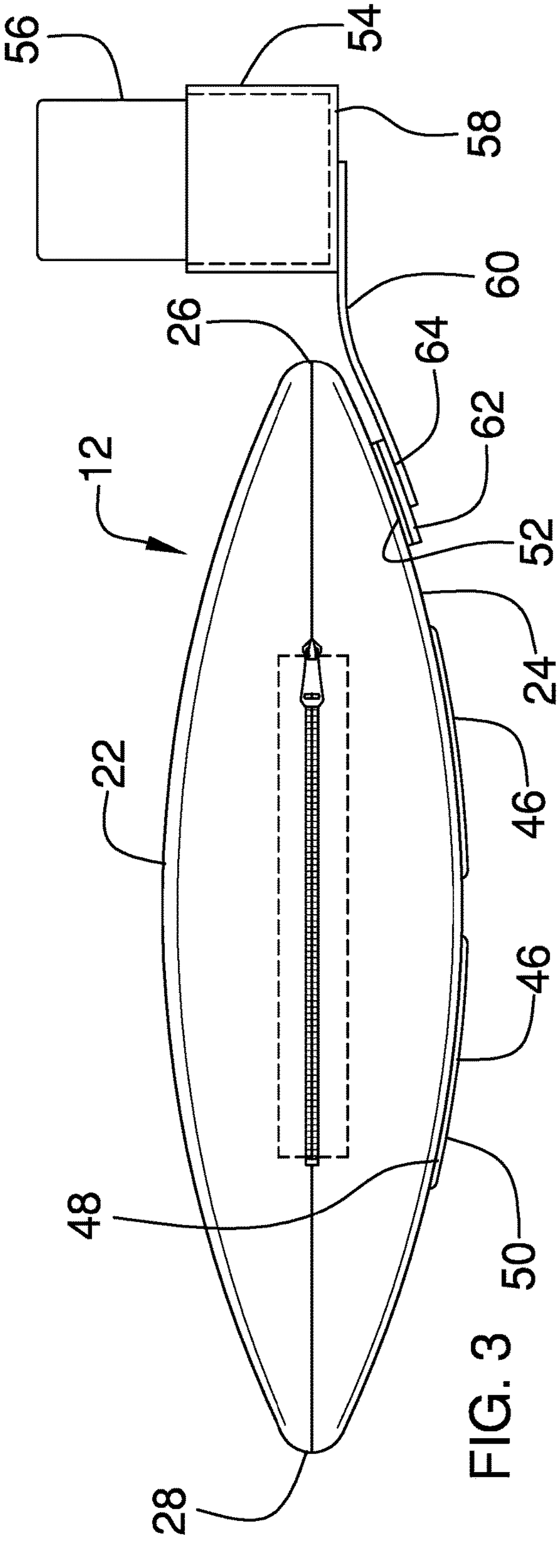
FIG. 3 is a right side view of an embodiment of the disclosure.
Figure 4:
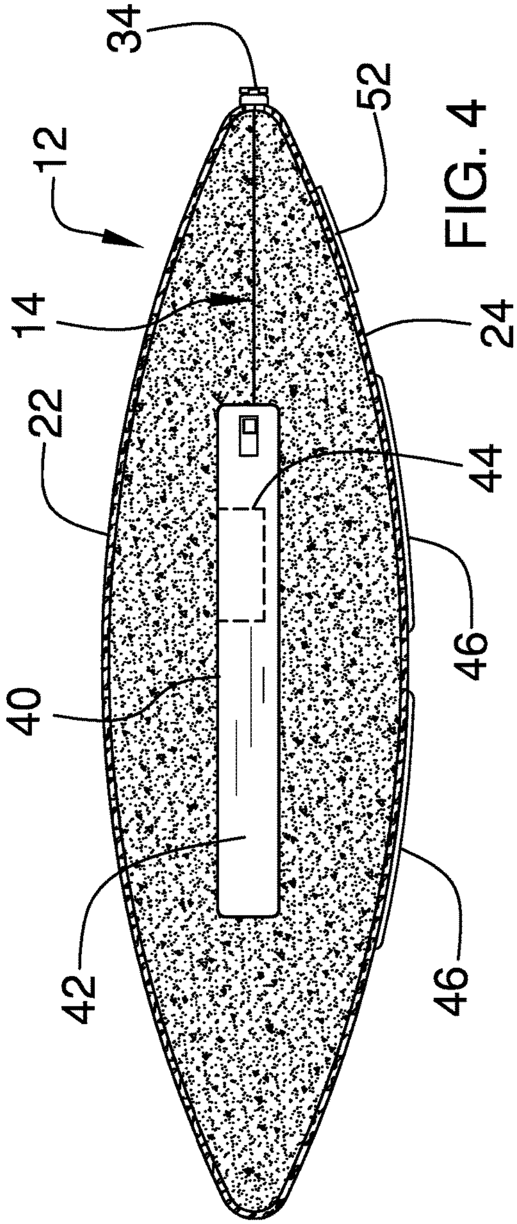
FIG. 4 is a cross sectional view taken along line 4-4 of FIG. 1 of an embodiment of the disclosure.
Figure 5:
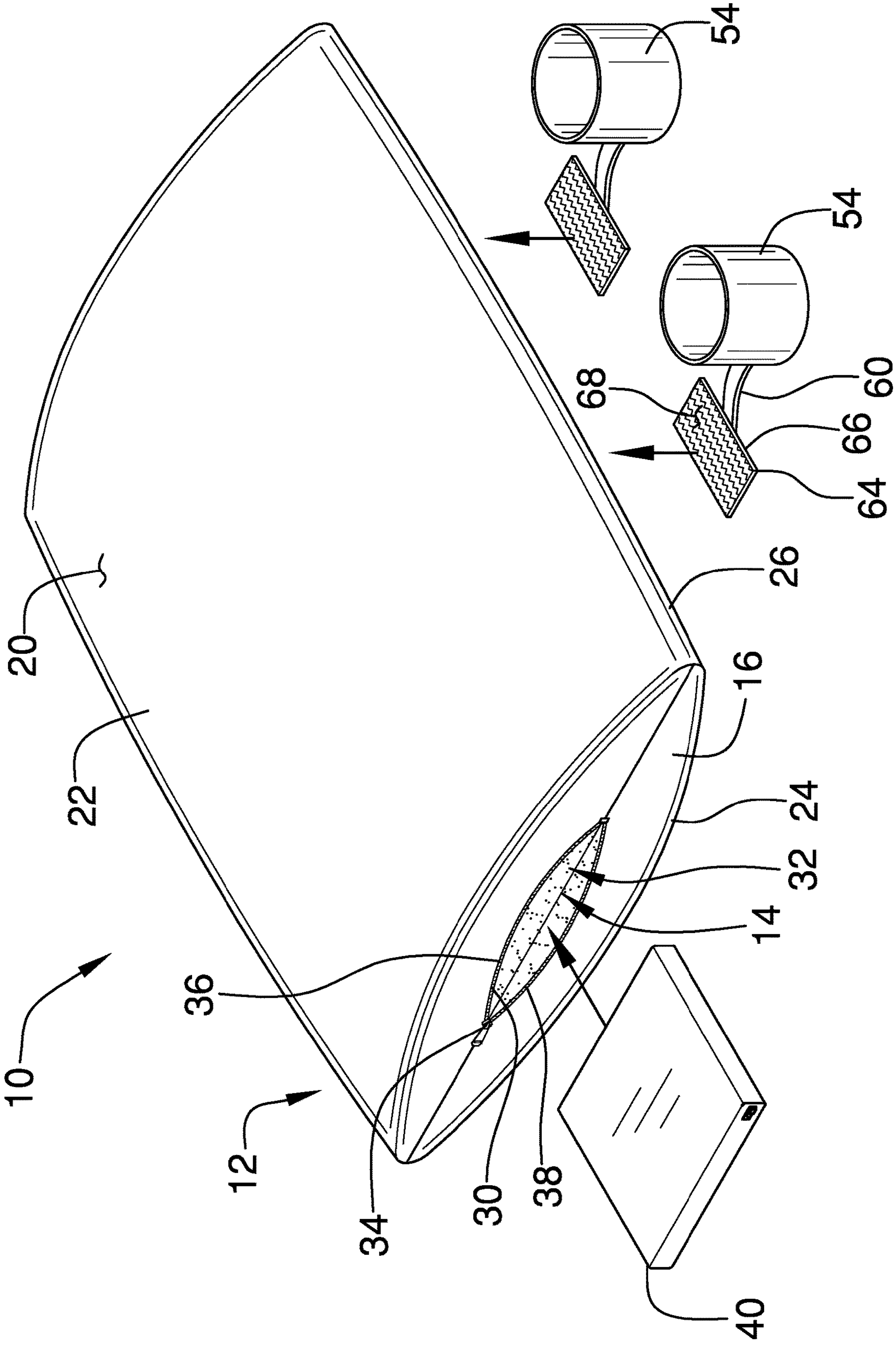
FIG. 5 is a perspective view of an embodiment of the disclosure.

With reference now to the drawings, and in particular to FIGS. 1 through 5 thereof, a new pillow device embodying the principles and concepts of an embodiment of the disclosure and generally designated by the reference numeral 10 will be described.

As best illustrated in FIGS. 1 through 5, the massaging pillow assembly 10 generally comprises a pillow 12 that has a plurality of pouches 14 each extending into an interior of the pillow 12 such that each of the pouches 14 can be accessed by a user. The pillow 12 has a first end 16, a second end 18 and an outer surface 20 extending between the first end 16 and the second end 18. The outer surface 20 has a top side 22, a bottom side 24, a first lateral side 26 and a second lateral side 28. The top side 22 and the bottom side 24 curve toward each other to intersect at each of the first lateral side 26 and the second lateral side 28. In this way the pillow 12 has an ovoid cross section taken perpendicular to a line extending through the first end 16 and the second end 18. The pillow 12 may be comprised of memory foam or other type of resiliently compressible material and the pillow 12 may include a pillowcase that surrounds the memory foam.

A respective one of the pouches 14 extends through the first end 16 and a respective one of the pouches 14 extends through the first lateral side 26. Additionally, each of the pouches 14 has a bounding edge 30 which defines an opening 32 into the pillow 12. A plurality of closures 34 is provided and each of the closures 34 includes a first portion 36 that is matable to a second portion 38. Each of the first portion 36 and the second portion 38 is coupled to respective sides of the bounding edge 30 of a respective one of the pouches 14 for opening and closing the pouches 14. Moreover, each of the closures 34 may comprise a zipper or other type of mechanical closure.

A vibration unit 40 is insertable into a respective one of the pouches 14 such that the vibration unit 40 is in mechanical communication with the pillow 12. Moreover, the vibration unit 40 generates a vibration when the vibration unit 40 is turned on thereby communicating the vibration into the pillow 12. In this way the pillow 12 can soothe the user with the vibration. The vibration unit 40 includes a housing 42 and a vibration device 44 that is positioned within the housing 42. The vibration device 44 engages the housing 42 such that the vibration device 44 vibrates the housing 42 when the vibration device 44 is turned on. Additionally, the housing 42 is in physical contact with the pillow 12 when the housing 42 is inserted into a respective pouch.

A pair of pads 46 is provided and each of the pads 46 is coupled to the pillow 12. Each of the pads 46 is comprised of a friction producing material to inhibit the pillow 12 from sliding. In this way the pillow 12 is inhibited from sliding on the user's lap, for example, when the pillow 12 is placed in the user's lap. Each of the pads 46 has a first surface 48 and a second surface 50, and the first surface 48 of each of the pads 46 is coupled to the bottom side 24 of the outer surface 20 of the pillow 12 such that the second surface 50 of each of the pads 46 can frictionally engage a surface. Each of the pads 46 is elongated to extend substantially between the first end 16 and the second end 18 of the pillow 12.

A pair of first mating members 52 is provided and each of the first mating members 52 is coupled to the pillow 12. Each of the first mating members 52 is positioned on the bottom side 24 of the outer surface 20 of the pillow 12. Additionally, each of the first mating members 52 is positioned between a respective one of the pads 46 and the first lateral side 26 of the outer surface 20 of the pillow 12. Each of the first mating members 52 may comprise a hook portion of a hook and loop fastener or other type of releasable mating member.

A pair of cup holders 54 is each removably attachable to the pillow 12 to hold a beverage container 56, and each of the cup holders 54 has a bottom wall 58. A pair of straps 60 is each coupled to and extends laterally away from the bottom wall 58 of a respective one of the cup holders 54. Each of the straps 60 has a distal end 62 with respect to the respective cup holder 54. A pair of second mating members 64 is provided and each of the second mating members 64 has a perimeter edge 66 and a primary surface 68. The perimeter edge 66 of each of the second mating members 64 is coupled to the distal end 62 of a respective one of the straps 60. The primary surface 68 of each of the second mating members 64 engages a respective one of the first mating members 52 for attaching the cup holder 54 on the respective strap 60 to the pillow 12.

In use, the vibration unit 40 is inserted into the respective pouch 14 and the vibration unit 40 is turned on to vibrate the pillow 12. In this way the pillow 12 can massage and soothe the user. Additionally, the pads 46 ensure that the pillow 12 remains where it was positioned while the vibration unit 40 vibrates the pillow 12. One or more of the cup holders 54 can be attached to the pillow 12 to hold a beverage container 56 while the user is relaxing with the pillow 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A massaging pillow assembly for massaging a user with vibration, said assembly comprising:

a pillow having a plurality of pouches each extending into an interior of said pillow wherein each of said pouches is configured to be accessed by a user;

a vibration unit being insertable into a respective one of said pouches such that said vibration unit is in mechanical communication with said pillow, said vibration unit generating a vibration when said vibration unit is turned on thereby communicating the vibration into said pillow wherein said pillow is configured to soothe the user with the vibration;

a pair of pads, each of said pads being coupled to said pillow, each of said pads being comprised of a friction producing material wherein each of said pads is configured to inhibit said pillow from sliding;

a pair of cup holders, each of said cup holders being removably attachable to said pillow wherein each of said cup holders is configured to hold a beverage container;

wherein said pillow has a first end, a second end and an outer surface extending between said first end and said second end, said pillow being elongated between said first end and said second end, said outer surface having a top side, a bottom side, a first lateral side and a second lateral side, said top side and said bottom side each being convex between said first lateral side and said second lateral side such that said pillow has a biconvex cross-sectional shape perpendicular to a longitudinal axis of said pillow, a respective one of said pouches extending through said first end, a respective one of said pouches extending through said first lateral side, each of said pouches having a bounding edge defining an opening into said pillow wherein said pillow further comprises a pair of first mating members, each of said first mating members being coupled to said pillow, each of said first mating members being positioned on said bottom side of said outer surface of said pillow, each of said first mating members being positioned between a respective one of said pads and said first lateral side of said outer surface of said pillow; and each of said cup holders has a bottom wall;

said assembly includes a pair of straps, each of said straps being coupled to and extending laterally away from said bottom wall of a respective one of said cup holders, each of said straps having a distal end with respect to said respective cup holder; and said assembly includes a pair of second mating members, each of said second mating members having a perimeter edge and a primary surface, said perimeter edge of each of said second mating members being coupled to said distal end of a respective one of said straps, said primary surface of each of said second mating members engaging a respective one of said first mating members for attaching said cup holder on said respective strap to said pillow.

2. The assembly according to claim 1, wherein said vibration unit includes a housing and a vibration device positioned within said housing, said vibration device engaging said housing such that said vibration device vibrates said housing when said vibration device is turned on, said housing being in physical contact with said pillow when said housing is inserted into a respective pouch.

3. The assembly according to claim 1, wherein each of said pads has a first surface and a second surface, said first surface of each of said pads being coupled to said bottom side of said outer surface of said pillow wherein said second surface of each of said pads is configured to frictionally engage a surface, each of said pads being elongated to extend substantially between said first end and said second end of said pillow.

4. A massaging pillow assembly for massaging a user with vibration, said assembly comprising;

a pillow having a plurality of pouches each extending into an interior of said pillow wherein each of said pouches is configured to be accessed by a user, said pillow having a first end, a second end and an outer surface extending between said first end and said second end, said pillow being elongated between said first end and said second end, said outer surface having a top side, a bottom side, a first lateral side and a second lateral side, said top side and said bottom side each being convex between said first lateral side and said second lateral side such that said pillow has a biconvex cross-sectional shape perpendicular to a longitudinal axis of said pillow, a respective one of said pouches extending through said first end, a respective one of said pouches extending through said first lateral side, each of said pouches having a bounding edge defining an opening into said pillow;

a plurality of closures, each of said closures including a first portion being mateable to a second portion, each of said first portion and said second portion being coupled to respective sides of said bounding edge of a respective one of said pouches for opening and closing said pouches;

a vibration unit being insertable into a respective one of said pouches such that said vibration unit is in mechanical communication with said pillow, said vibration unit generating a vibration when said vibration unit is turned on thereby communicating the vibration into said pillow wherein said pillow is configured to soothe the user with the vibration, said vibration unit including a housing and a vibration device positioned within said housing, said vibration device engaging said housing such that said vibration device vibrates said housing when said vibration device is turned on, said housing being in physical contact with said pillow when said housing is inserted into a respective pouch;

a pair of pads, each of said pads being coupled to said pillow, each of said pads being comprised of a friction producing material wherein each of said pads is configured to inhibit said pillow from sliding, each of said pads having a first surface and a second surface, said first surface of each of said pads being coupled to said bottom side of said outer surface of said pillow wherein said second surface of each of said pads is configured to frictionally engage a surface, each of said pads being elongated to extend substantially between said first end and said second end of said pillow;

a pair of first mating members, each of said first mating members being coupled to said pillow, each of said first mating members being positioned on said bottom side of said outer surface of said pillow, each of said first mating members being positioned between a respective one of said pads and said first lateral side of said outer surface of said pillow;

a pair of cup holders, each of said cup holders being removably attachable to said pillow wherein each of said cup holders is configured to hold a beverage container, each of said cup holders having a bottom wall;

a pair of straps, each of said straps being coupled to and extending laterally away from said bottom wall of a respective one of said cup holders, each of said straps having a distal end with respect to said respective cup holder; and a pair of second mating members, each of said second mating members having a perimeter edge and a primary surface, said perimeter edge of each of said second mating members being coupled to said distal end of a respective one of said straps, said primary surface of each of said second mating members engaging a respective one of said first mating members for attaching said cup holder on said respective strap to said pillow.

* * * * *